US011431493B1

(12) United States Patent
Lewi et al.

(10) Patent No.: US 11,431,493 B1
(45) Date of Patent: Aug. 30, 2022

(54) SYSTEMS AND METHODS FOR SECURE AUTHENTICATION

(71) Applicant: Meta Platforms, Inc., Menlo Park, CA (US)

(72) Inventors: Kevin Lewi, Mountain View, CA (US); Yue Ting Lee, Menlo Park, CA (US); Haozhi Xiong, Fremont, CA (US); Benjamin B. Yang, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 294 days.

(21) Appl. No.: 16/245,078

(22) Filed: Jan. 10, 2019

(51) Int. Cl.
H04L 9/40 (2022.01)
H04L 9/08 (2006.01)
H04L 9/32 (2006.01)

(52) U.S. Cl.
CPC .......... *H04L 9/0866* (2013.01); *H04L 9/0869* (2013.01); *H04L 9/3242* (2013.01); *H04L 9/3263* (2013.01); *H04L 63/0884* (2013.01)

(58) Field of Classification Search
CPC ... H04L 9/0866; H04L 9/0869; H04L 9/3242; H04L 63/0435; H04L 63/062; H04L 63/064; H04L 63/0807; H04L 63/123; H04L 63/126
See application file for complete search history.

(56) References Cited

U.S. PATENT DOCUMENTS

| | | | | |
|---|---|---|---|---|
| 6,892,308 B1* | 5/2005 | Medvinsky | ......... | H04L 65/1043 726/6 |
| 7,624,269 B2* | 11/2009 | Appenzeller | ......... | H04L 9/0866 380/277 |
| 7,975,139 B2* | 7/2011 | Coulier | ............... | H04L 63/0435 713/169 |
| 8,555,351 B2* | 10/2013 | Readshaw | ............. | H04L 9/3271 726/5 |
| 2004/0105549 A1* | 6/2004 | Suzuki | .................... | H04L 9/083 380/278 |
| 2004/0117490 A1* | 6/2004 | Peterka | .................... | G06F 21/10 709/229 |
| 2005/0071631 A1* | 3/2005 | Langer | .................... | H04L 9/302 713/156 |
| 2007/0198836 A1* | 8/2007 | Fedyk | .................... | H04L 9/0833 713/171 |
| 2009/0287922 A1* | 11/2009 | Herwono | ............. | H04L 63/0853 713/155 |
| 2012/0124202 A1* | 5/2012 | Cooper | .................... | H04L 67/14 709/224 |
| 2013/0042112 A1* | 2/2013 | Spector | .................... | H04L 63/06 713/171 |
| 2013/0138957 A1* | 5/2013 | Dharmarajan | ...... | H04L 67/2814 713/168 |
| 2013/0305332 A1* | 11/2013 | Narasimhan | .......... | H04L 63/064 726/7 |

(Continued)

*Primary Examiner* — Eric W Shepperd
(74) *Attorney, Agent, or Firm* — Sheppard Mullin Richter & Hampton LLP

(57) ABSTRACT

Systems, methods, and non-transitory computer-readable media can be configured to generate a first key for a first entity. A second key for a second entity can be generated wherein the first entity can authenticate the second entity based on an authentication token generated based on the second key. In some instances, the first entity can be a server and the second entity can be a client.

18 Claims, 7 Drawing Sheets

(56) References Cited

U.S. PATENT DOCUMENTS

| | | | |
|---|---|---|---|
| 2014/0143375 A1* | 5/2014 | Walker | H04L 69/14 709/217 |
| 2014/0149741 A1* | 5/2014 | Balakrishnan | G06F 21/335 713/159 |
| 2014/0230006 A1* | 8/2014 | Burke | H04L 41/5032 726/1 |
| 2014/0258456 A1* | 9/2014 | Lee | H04W 28/02 709/217 |
| 2016/0132214 A1* | 5/2016 | Koushik | G06F 9/455 715/741 |
| 2016/0134616 A1* | 5/2016 | Koushik | H04L 63/0807 726/9 |
| 2017/0187691 A1* | 6/2017 | Lee | H04L 41/08 |
| 2017/0244680 A1* | 8/2017 | Chen | H04L 9/0891 |
| 2017/0244682 A1* | 8/2017 | Chen | H04L 63/0485 |

\* cited by examiner

SYSTEMS AND METHODS FOR SECURE AUTHENTICATION

FIELD OF THE INVENTION

The present technology relates to the field of secure authentication. More particularly, the present technology relates to techniques for providing secure authentication across distributed computerized services.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others. In some cases, it may be advantageous to allow certain users to access certain posted content and restrict other users from access to the certain posted content.

SUMMARY

Various embodiments of the present technology can include systems, methods, and non-transitory computer readable media configured to generate a first key for a first entity. A second key for a second entity can be generated wherein the first entity can authenticate the second entity based on an authentication token generated based on the second key.

In some embodiments, the first key is generated based in part on an identity associated with the first entity.

In some embodiments, the second key is generated based in part on an identity associated with the second entity and the identity associated with the first entity.

In some embodiments, a derived second key, symmetric to the second key, can be generated based on the first key and an identity associated with the second entity.

In some embodiments, the first key is generated based on applying a pseudorandom function to a root key and an identity associated with the first entity.

In some embodiments, the second key is generated based on applying a pseudorandom function to the first key and an identity associated with the second entity.

In some embodiments, the authentication token comprises a message and a message authentication code.

In some embodiments, the message authentication code is generated based on the second key and the message.

In some embodiments, the message authentication code is authenticated.

In some embodiments, the message authentication code is authenticated based on a derived second key, symmetric to the second key.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
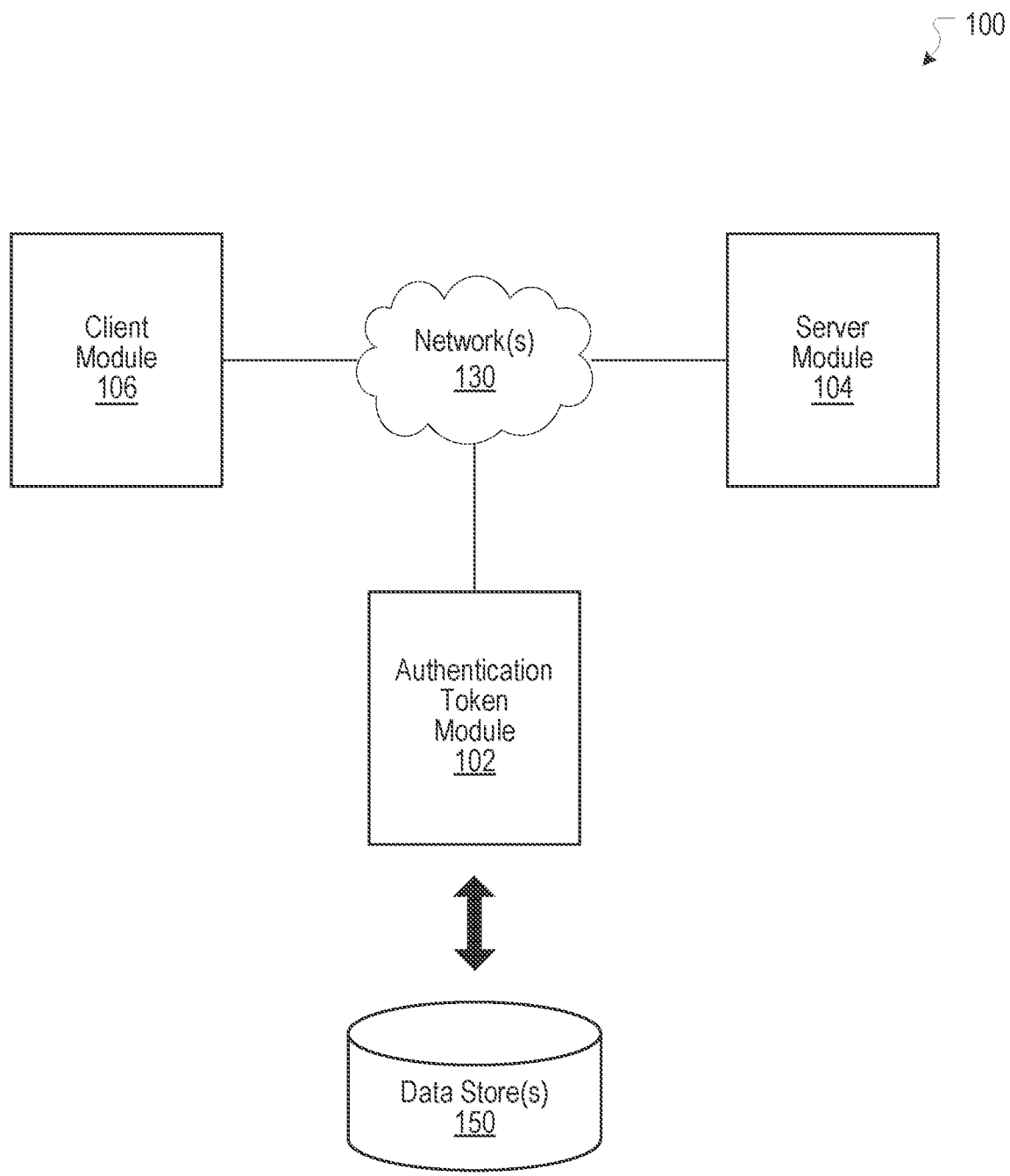
FIG. 1 illustrates an example system including an example authentication token module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Secure Authentication

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others. In some cases, it may be advantageous to allow certain users to access certain posted content and restrict other users from access to the certain posted content.

Under conventional approaches, users can post content to a social network (or social networking system) and access content posted to the social network by other users. By allowing users to post content and access content posted by other users, the social network can allow users to communicate and share content with each other. In general, users may post a variety of content related to a variety of topics for the purpose of sharing the content with other users. However, in some cases, users may post sensitive information to the social network and may want to restrict other users from accessing the sensitive information. Accordingly, it would be advantageous for the social network to authenticate users on the social network so that, for example, users can access sensitive information they post while other users are restricted from accessing the sensitive information. However, under conventional approaches, authenticating users on the social network can present significant challenges. An example of a conventional approach is utilizing a certificate authority to issue, for example, public key infrastructure (PKI) certificates through a transport layer security (TLS)

protocol. This conventional approach is incapable of allowing, for example, a backend service on a social network to directly authenticate a user that is requesting information from the backend service through intermediates, such as proxies or frontend services. Rather, under this conventional approach, the backend service relies on the intermediates to authenticate the user. Relying on intermediates, as this conventional approach does, presents significant challenges in terms of scalability, flexibility, and security when applied to a large infrastructure like a social network. For example, a request may require several authentications or be required to pass through certain authenticated intermediates. Further, requiring several intermediates to be authenticated allows for several points where security can be compromised. These challenges are exacerbated as the number of users, the number of posted content, the number of backend services, and the number of intermediates on the social network increase. Thus, conventional approaches, such as the one described, are not effective in addressing these and other problems arising in computer technology.

An improved approach rooted in computer technology overcomes the foregoing and other disadvantages associated with conventional approaches specifically arising in the realm of computer technology. In various embodiments, the present technology provides for a token-based authentication protocol that can facilitate authenticated communications between a number of entities. The token-based authentication protocol can facilitate the creation of cryptographic authentication tokens (i.e., crypto auth tokens, CATs). In some embodiments, the present technology can generate a verification key (e.g., server key) for a first entity (e.g., server). The verification key can be based on the first entity and allow the first entity to verify or authenticate communications with the first entity. Additionally, in some embodiments, the present technology can generate a creation key (e.g., client-server key) for a second entity (e.g., client) that seeks to communicate with the first entity. The creation key can be based on both the first entity and the second entity. An authentication token can be generated based on the creation key, and the first entity can, based on the authentication token, authenticate communications from the second entity. In some embodiments, the first entity can authenticate communications from the second entity by generating a derived creation key based on the verification key and the second entity. The derived creation key can be symmetric to the creation key utilized by the second entity. Accordingly, the first entity can utilize the symmetric derived creation key to verify the authentication token and authenticate communications from the second entity. For example, a social networking system may utilize a central token service to generate and distribute verification keys to its backend services. When a user associated with a client device makes a request for content from the social networking system, the central token service can generate a creation key corresponding to the user and the appropriate backend service. Based on the creation key, the user can generate an authentication token associated with the request for content. When the authentication token and associated request is communicated to the backend service, the backend service can, based on the authentication token, authenticate the user, authenticate the request, and accordingly provide the requested content. In this example, the request for content can be communicated through various proxies or frontend services in the social networking system, and the backend service does not need to rely on these various proxies or frontend services to authenticate the user and the request. Further, because the backend service can authenticate the user and the request based on the authentication token, the need to authenticate communications between the various proxies or frontend services is obviated. As illustrated in the above example, the present technology offers improved scalability, flexibility, and security over conventional approaches. Additional details relating to the present technology are provided below.

FIG. 1 illustrates an example system 100 including an example authentication token module 102, according to an embodiment of the present technology. As shown in the example of FIG. 1, the example system 100 can also include a server module 104 and a client module 106. In some embodiments, the authentication token module 102 can be implemented, in part or in whole, in conjunction with or be integrated with the server module 104 and/or the client module 106. In some embodiments, the authentication token module 102, the server module 104, and the client module 106 can interact with one another over one or more network(s) 130. The network(s) 130 can be any wired or wireless computer network through which devices can exchange data. For example, the network(s) 130 can be a personal area network, a local area network, or a wide area network. In some embodiments, the example system 100 can include one or more data store(s) 150. In some embodiments, the authentication token module 102 and the server module 104 can be administered or otherwise operated by an entity. In some embodiments, the authentication token module 102 and the server module 104 are operated by separate entities. The components (e.g., modules, elements, steps, blocks, etc.) shown in this figure and all figures herein are exemplary only, and other implementations may include additional, fewer, integrated, or different components. Some components may not be shown so as not to obscure relevant details.

In some embodiments, the authentication token module 102, server module 104, and client module 106 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some embodiments, one or more of the authentication token module 102, server module 104, and client module 106 can, in part or in whole, be implemented within or configured to operate in conjunction with or be integrated with a social networking system (or service), such as a social networking system 630 of FIG. 6. In some embodiments, the authentication token module 102, server module 104, and client module 106 can be, in part or in whole, implemented within or configured to operate in conjunction or be integrated with a computing system, such as the external system 620 of FIG. 6. For example, the external system 620 can implement the client module 106 in a web page, such as the web page 622a, 622b of FIG. 6. Many variations are possible. In some embodiments, the authentication token module 102, server module 104, and client module 106 can be, in part or in whole, implemented within or configured to operate in conjunction with or be integrated with a client computing device, such as the user device 610 of FIG. 6. For example, the authentication token module 102, server module 104, and client module 106 can be implemented as or within a dedicated application (e.g., app), a program, or an applet running on a user computing device or client computing system. The application incorporating or implementing instructions for performing functionality of the authentication token module 102, server module 104, and client module 106 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. Many variations are possible.

The authentication token module 102 can be configured to communicate and/or operate with one or more data store(s) 150, as shown in the example system 100. The one or more data store(s) 150 can be configured to store and maintain various types of data including, for example, verification keys and creation keys. In some implementations, the one or more data store(s) 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the one or more data store(s) 150 can store information associated with users, such as user identifiers, user information, profile information, user specified settings, content produced or posted by users, and various other types of user data.

In various embodiments, the present technology provides for generation and verification of cryptographic authentication tokens (e.g., crypto auth tokens, CATs). Such authentication tokens can comprise information to facilitate authenticated communication between a number of entities (e.g., servers, clients, etc.). In some embodiments, authentication tokens can comprise an identity associated with an entity that generated the authentication tokens. In some embodiments, authentication tokens can comprise an identity associated with an entity with whom the entity that generated the authentication tokens seek to communicate. In some embodiments, authentication tokens can comprise a payload comprising information to be communicated via the authentication tokens. In some embodiments, authentication tokens can comprise a message authentication code (MAC). Authentication tokens can be verified based in part on the MAC. Additionally, authentication tokens can comprise a creation time and an expiration time that correspond with, respectively, when the authentication tokens were created and when the authentication tokens are set to expire. When the authentication tokens are set to expire can be, for example, a threshold number of hops or a threshold number of intermediate devices through which the authentication tokens may pass. For example, a user of a social networking system may request information from a backend service in the social networking system. The user may generate and send an authentication token that comprises a user ID that identifies the user, a backend ID that identifies the backend service, a MAC that allows the backend service to verify the authentication token, and a payload comprising information associated with the request. Many variations are possible.

In various embodiments, the authentication token module 102 can authenticate and identify entities (e.g., servers, clients, etc.), generate verification keys, and generate creation keys. Authentication tokens can be generated based on the creation keys, and the authentication tokens can be verified or authenticated based on the verification keys and identities associated with the entities that generated the authentication tokens. In some embodiments, the authentication token module 102 can utilize a root (e.g., master) key to generate verification keys and creation keys. The authentication token module 102 can generate a verification key for a server entity, or associated service, based on an identity associated with the server entity. Additionally, the authentication token module 102 can generate a creation key based on an identity associated with a client entity and the identity associated with the server entity. The client entity can generate an authentication token based on the creation key, and the server entity can verify the authentication token and authenticate the client entity, based on the authentication token. For example, the authentication token module 102 can authenticate a server entity, such as a messaging service in a social networking system, and utilize a root key "K" to generate a verification key "KA" for the messaging service. The verification key "KA" can be generated based in part on an identity associated with the messaging service. A client entity, such as a user of a social networking system who is associated with a client device, may want to request messages from the messaging service. In this example, the authentication token module 102 can authenticate the user and generate a creation key "KBA" for the user. The creation key "KBA" can be generated based on an identity associated with the user and the identity associated with the messaging service. The user can utilize the creation key "KBA" to generate an authentication token, and the user can utilize the authentication token to request messages from the messaging service. The messaging service can use the verification key "KA" and the identity associated with the user to generate a derived creation key that is symmetric to the creation key "KBA." Accordingly, the messaging service can authenticate the request, and the user, based on the authentication token and provide the requested messages. While a messaging service (or associated server entity) is discussed herein for purposes of illustration, the present technology can apply to any other type of service (or associated server entity). Further, while a social networking system is discussed herein for purposes of illustration, the present technology can be applied to any other type of system or platform. More details regarding the authentication token module 102 will be provided below with reference to FIG. 2.

In various embodiments, the client module 104 can generate an authentication token based on a creation key. The creation key can be provided, for example, by the authentication token module 102. The creation key can be based on an identity associated with a client entity. Additionally, the creation key can be based on an identity associated with a server entity with which the client entity seeks to communicate. For example, the client entity may be a user of a social networking system who is associated with a client device and the identity may be, for example, a user ID associated with the user. The server entity may be, for example, any of a number of backend services associated with the social networking system, and the identity associated with the server entity can be a name of the backend service. In some embodiments, the client module 104 can utilize a creation key to generate a message authentication code (MAC). In general, a MAC can be generated based on a key and a message. The client module 104 can generate a MAC based on a creation key and a message, such as a request for information, for a server entity. The MAC can be incorporated in an authentication token generated by the client module 104. The authentication token can be verified based on the MAC.

In various embodiments, the server module 106 can authenticate a client entity or a request from the client entity based on an authentication token generated by the client entity and a verification key. The verification key can be provided, for example, by the authentication token module 102. The verification key can be based on an identity associated with a server entity. In some embodiments, the server module 106 can generate a derived creation key based on a verification key and an identity associated with a client entity. The derived creation key and a creation key associated with the client entity can be symmetric keys. The server module 106 can utilize the derived creation key to verify an authentication token. For example, a backend service in a social networking system may receive a verification key based on an identity associated with the backend service. A user of the social networking system may make a request to the backend service and accordingly generate and send an authentication token comprising, for example, a message authentication code (MAC) and a user ID associated with the user. The MAC can be generated based on a creation key provided to the user. The backend service can, based on the user ID and the verification key, generate a derived creation key that is symmetric to the creation key the user utilized to generate the MAC. Accordingly, the backend service can utilize the derived creation key to authenticate or verify the MAC. Based on the verification, the backend service can verify the authentication token, authenticate the request, and the user, and accordingly respond to the request.

Figure 2:
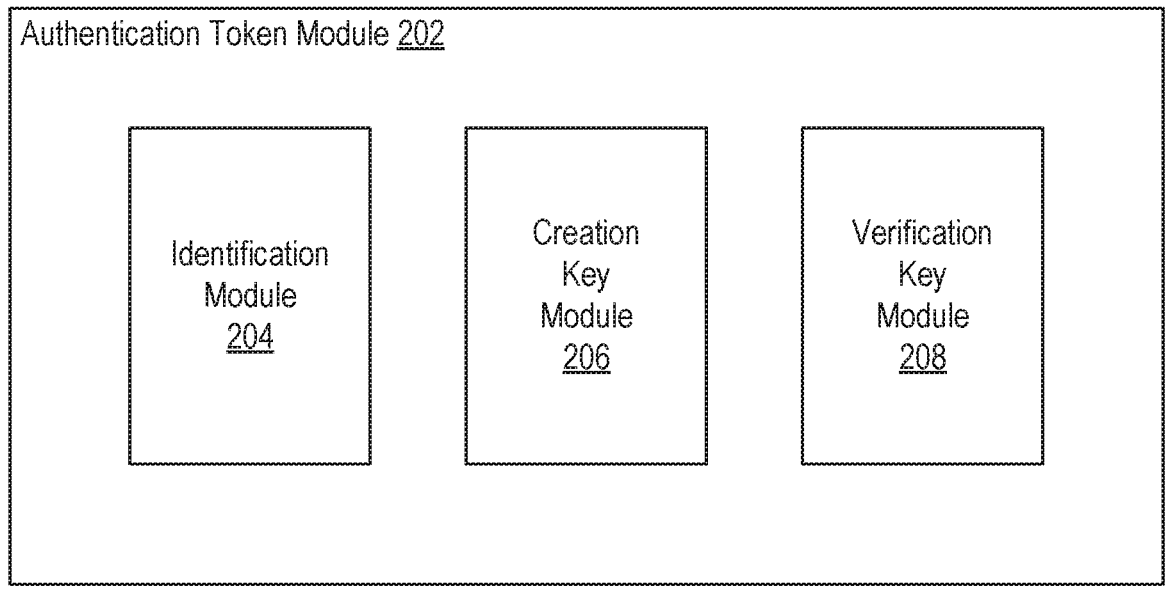
FIG. 2 illustrates an example of an authentication token module, according to an embodiment of the present technology.

FIG. 2 illustrates an example of an authentication token module 202 configured to authenticate entities (e.g., servers, clients, etc.) and generate verification keys and creation keys. In some embodiments, the authentication token module 102 of FIG. 1 can be implemented as the authentication token module 202. As shown in FIG. 2, the authentication token module 202 can include an identification module 204, a creation key module 206, and a verification key module 208.

The identification module 204 can authenticate and assign identities associated with client entities or server entities. In some embodiments, the identification module 204 can assign unique identities to client entities and server entities. For example, a social networking system may comprise a number of proxies, frontend services, and backend services. The identification module 204 can assign each proxy, frontend service, and backend service a unique identity. In some embodiments, the unique identity can correspond to a certificate, or other form of identification, distributed by the identification module 204. The identification module 204 can authenticate an identity associated with a server entity based on a certificate, or other credentials, associated with the server entity. In some embodiments, the identification module 204 can verify a certificate associated with a server entity by utilizing a key and, based on the key and the certificate, authenticate an identity associated with the server entity. Many variations are possible. In some embodiments, the identification module 204 can assign a unique identity to a client entity based on login credentials, or other credentials. For example, a user may login to a social networking system using a username and password. The identification module 204 can assign a unique identity, such as a user ID, to the user. In some embodiments, the identification module 204 can assign an identity to a client entity corresponding to a session. The session can be associated with a period of time or a period of activity between when the client entity logs in and when the client entity logs out. For example, a user may log in to a social networking system using a first computing device. The identification module 204 can assign a first identity, such as a first session ID, to the user. The user may log out of the social networking system and then login to the social networking system using a second computing device. The identification module 204 can assign a second identity, such as a second session ID, to the user. Many variations are possible.

The creation key module 206 can generate a creation key for a client entity. In some embodiments, the creation key module 206 can generate a creation key based on a root (e.g., master) key, an identity associated with a client entity, and an identity associated with a server entity. In some embodiments, the creation key module 206 can generate a creation key based on a verification key generated for a server entity and an identity associated with a client entity. The creation key module 206 can generate a creation key by applying one or more first cryptographic functions (e.g., pseudorandom functions (PRFs)) to a root key and an identity associated with a server entity and applying one or more second cryptographic functions to a result of the first cryptographic functions and an identity associated with a client entity. In some embodiments, the first cryptographic functions and the second cryptographic functions can be the same functions. In some embodiments, a creation key module 206 can generate a creation key for a client entity that seeks to communicate with a server entity by applying a pseudorandom function PRF(PRF(K, server_identity), client_identity), where K corresponds to a root key, server_identity corresponds to an identity associated with the server entity, and client_identity corresponds to an identity associated with the client entity. For example, based on a root key "K*," an identity "Messages" associated with a server entity, and an identity "User" associated with the user, the creation key module 206 can apply a pseudorandom function PRF (PRF(K*, "Messages"), "User") to generate a creation key for the user. In some embodiments, a creation key can be a twice derived key. The creation key module 206 can generate a creation key by applying one or more cryptographic functions to a verification key generated for a server entity and an identity associated with a client entity. For example, a verification key for a server entity, such as a messaging service, can be generated using a root key "K*" and an identity "Messages" associated with the server entity. By applying a pseudorandom function PRF(K*, "Messages"), the verification key "Km" can be generated, as discussed in more detail below. The creation key module 206 can generate a creation key for a client entity that seeks to communicate with the messaging service based on an identity "User" associated with the client entity and the verification key "Km" by applying a pseudorandom function PRF(KM, "User"). An authentication token for communicating with the messaging service can be generated based on the creation key.

The verification key module 208 can generate a verification key for a server entity. In some embodiments, the verification key module 208 can generate a verification key based on a root (e.g., master) key and an identity associated with a server entity. The verification key module 208 can generate a verification key by applying one or more cryptographic functions (e.g., pseudorandom functions (PRFs)) to a root key and an identity associated with a server entity. In some embodiments, the verification key module 208 can apply a pseudorandom function PRF(K, identity), where K corresponds to a root key and identity corresponds to an identity associated with a server entity. For example, the verification key module 208 can, based on a root key "K*" and an identity "Messages" associated with a server entity, apply a pseudorandom function PRF(K*, "Messages") to generate a verification key for the server entity. In some embodiments, the root key regularly or intermittently rotates to new root keys. Accordingly, the verification key module 206 can generate new verification keys based on the new root keys.

In some embodiments, a verification key can be utilized to generate a derived creation key. A derived creation key can be generated based on a verification key and an identity associated with a client entity. The derived creation key can be generated by applying one or more cryptographic functions (e.g., pseudorandom functions (PRFs)) to the verification key and the identity associated with the client entity. For example, the verification module 208 may provide a server entity with a verification key "Km" based on a root key and an identity associated with the server entity. The server entity may receive an authentication token from a client entity with an identity "User" associated with the client entity. The server entity can generate a derived creation key by applying a pseudorandom function to the verification key and the identity "User" associated with the client entity, such as PRF(KM, "User"). The derived creation key can be used to verify the authentication token and authenticate the client entity. In some embodiments, a derived creation key and a creation key are symmetric keys. The derived creation key and the creation key can be generated using the same cryptographic functions or pseudorandom functions. Many variations are possible.

Figure 3:
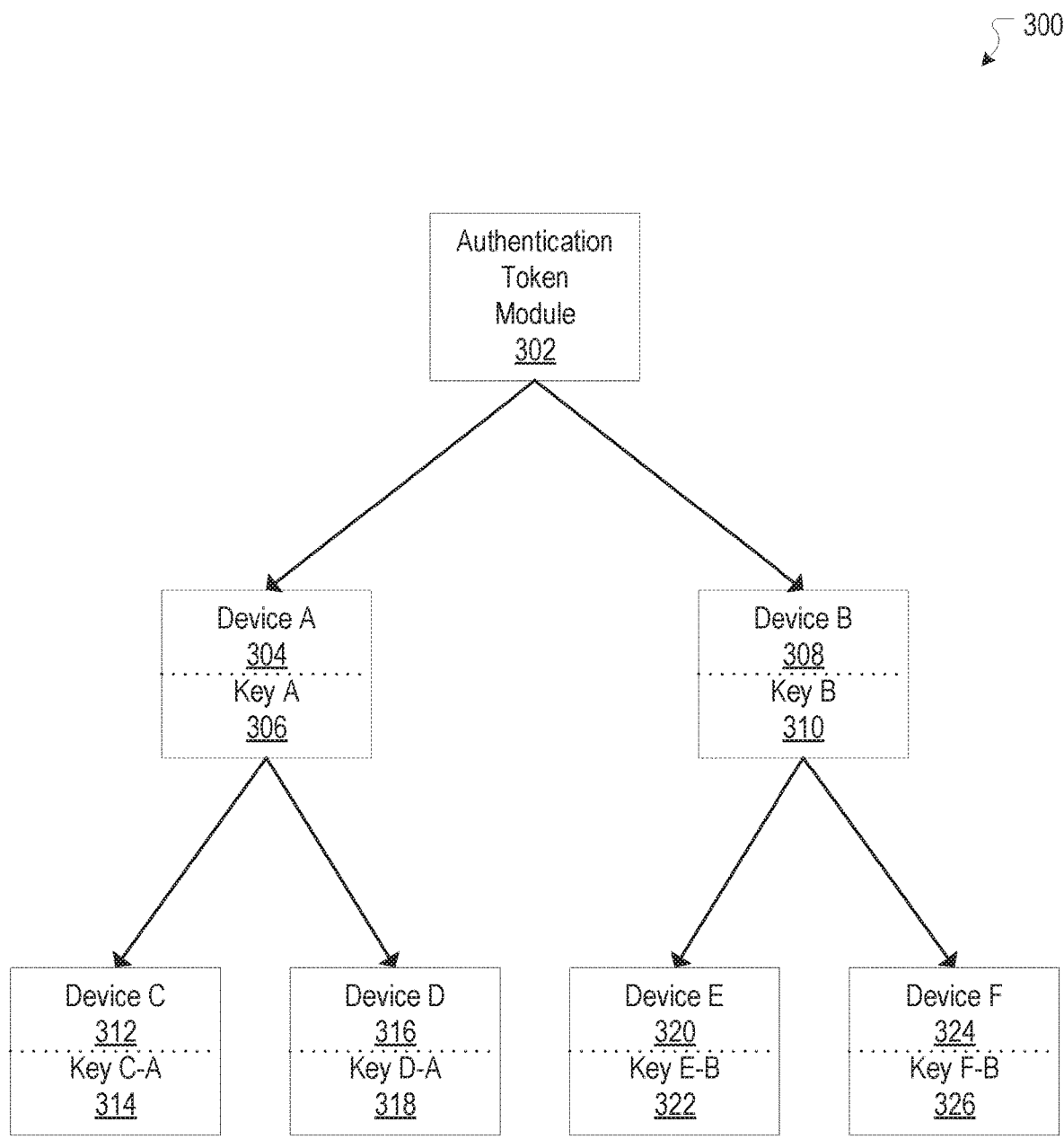
FIG. 3 illustrates an example functional block diagram, according to an embodiment of the present technology.

FIG. 3 illustrates an example functional block diagram 300, according to an embodiment of the present technology. The example function block diagram 300 illustrates example generation and distribution of verification keys and creation keys. It should be understood that there can be additional, fewer, or alternative steps performed in various orders, or in parallel, based on various embodiments in accordance with the present technology.

In this example, an authentication token module 302 generates a key A 306 for device A 304 and a key B 310 for device B 308. In some embodiments, the authentication token module 302 can implement functionality of the authentication token module 102. Key A 306 and key B 310 can be, for example, verification keys, and device A 304 and device B 308 can be, for example, server entities, as described herein. The authentication token module 302 can also generate a key C-A 314 for device C 312 and a key D-A 318 for device D 316. Key C-A 314 and key D-A 318 can be, for example, creation keys, and device C 312 and device D 316 can be, for example, client entities, as described herein. Key C-A 314 can be utilized to generate authentication tokens for communication between device C 312 and device A 304. Similarly, key D-A 318 can be utilized to generate authentication tokens for communication between device D 316 and device A 304. Device A 304 can utilize key A 306 to verify authentication tokens from device C 312 and from device D 316 and accordingly authenticate communication with, respectively, device C 312 and with device D 316. The authentication token module 302 can also generate a key E-B 322 for device E 320 and a key F-B 326 for device F 324. Key E-B 322 and key F-B 326 can be, for example, creation keys, and device E 320 and device F 324 can be, for example, client entities, as described herein. Key E-B 322 can be utilized to generate authentication tokens for communication between device E 320 and device B 308. Similarly, key F-B 326 can be utilized to generate authentication tokens for communication with device F 324 and with device B 308. Device B 308 can utilize key B 310 to verify authentication tokens from device E 320 and device F 324 and accordingly authenticate communication with, respectively, device E 320 and device F 324. As illustrated in this example, a verification key is scoped to or uniquely associated with a corresponding server entity. For example, device A 304, based on key A 306, cannot verify an authentication token generated based on key E-B 322 from device E 320. Further, as illustrated in this example, a creation key generated for a client entity is scoped to or uniquely associated with the client entity and a corresponding server entity with which the client entity communicates. Accordingly, for example, device C 312 cannot utilize key C-A 314 to generate an authentication token for communication with device B 308. If device B 308 received an authentication token from device C 312 generated using key C-A 314, device B 308 would not be able to verify the authentication token using key B 310 and would not be able to authenticate communication with device C 312. As another example, device C 312 cannot utilize key D-A 318 to generate an authentication token for communication with device A 304. If device A 304 received an authentication token from device C 312 generated using key D-A 318, device A 304 would not be able to verify the authentication token using an identity associated with device C 312 and would not be able to authenticate communication with device C 312. All examples herein are provided for illustrative purposes, and there can be many variations and other possibilities.

Figure 4:
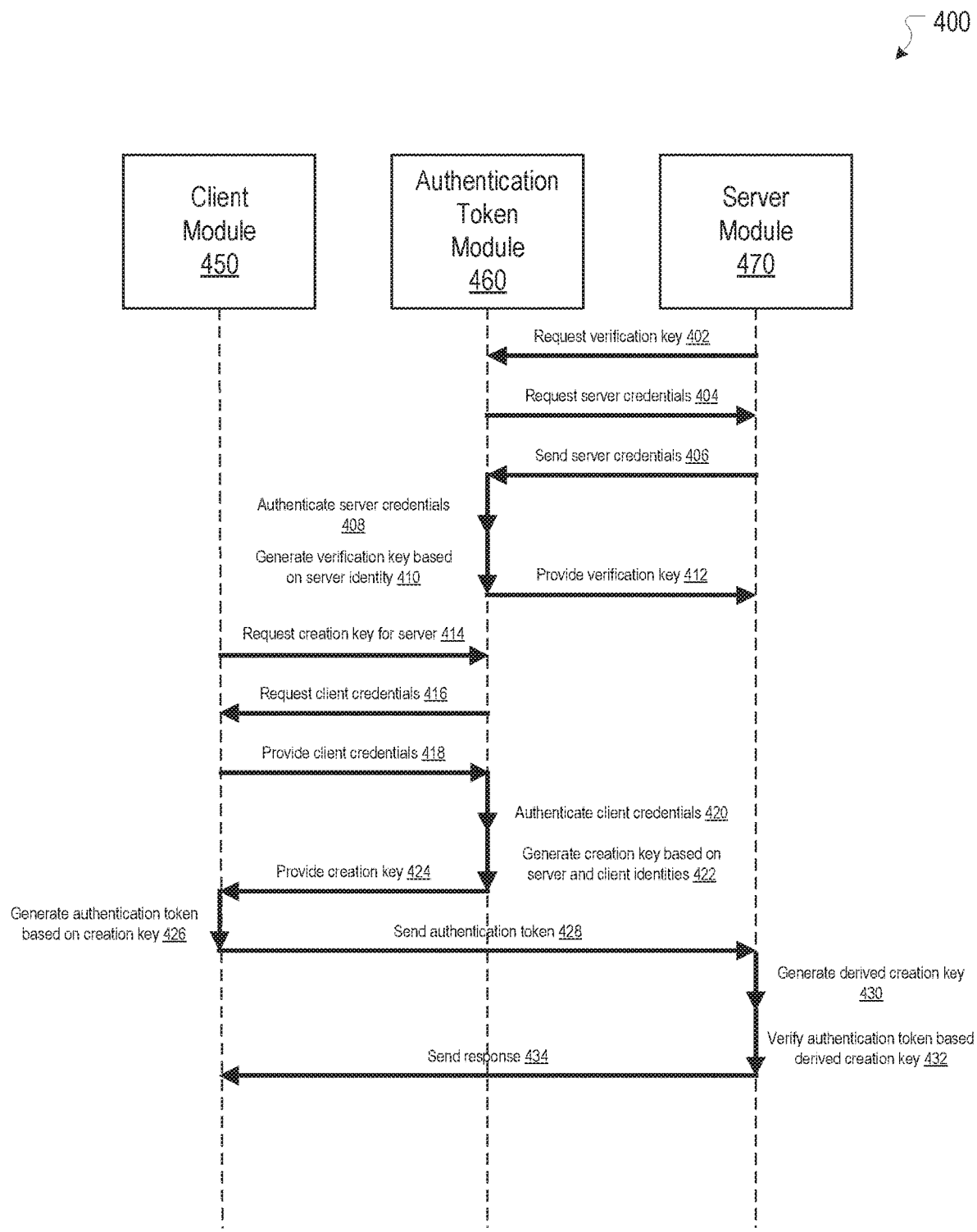
FIG. 4 illustrates an example timing diagram, according to an embodiment of the present technology.

FIG. 4 illustrates an example timing diagram 400, according to an embodiment of the present technology. The example timing diagram 400 illustrates example interactions between a client module 450, an authentication token module 460, and a server module 470. In some embodiments, the client module 450, the authentication token module 460, and the server module 470 can implement functionality of, respectively, the client module 104, the authentication token module 102, and the server module 106. It should be understood that there can be additional, fewer, or alternative steps performed in various orders, or in parallel, based on various embodiments in accordance with the present technology.

At step 402, the server module 470 requests a verification key from the authentication token module 460. At step 404, the authentication token module 460 requests server credentials from the server module 470. At step 406, the server module 470 sends server credentials to the authentication token module 460. In this step, the server credentials can include a server identity or an identity associated with the server module 470. At step 408, the authentication token module 460 authenticates the server credentials. At step 410, the authentication token module 460 generates a verification key based on the server identity. For example, in this step, the verification key can be generated based on a root key and the identity associated with the server module 470. At step 412, the authentication token module 460 provides the verification key to the server module 470. At step 414, the client module 450 requests a creation key from the authentication token module 460 for communication with the server module 470. At step 416, the authentication token module 460 requests client credentials from the client module 450. At step 418, the client module 450 provides client credentials to the authentication token module 460. In this step, the client credentials can be provided, for example, through a user login. The client credentials can include a client identity or an identity associated with the client module 450. At step 420, the authentication token module 460 authenticates the client credentials. At step 422, the authentication token module 460 generates a creation key based on the server identity and the client identity. For example, in this step, the creation key can be generated based on a root key, the identity associated with the server module 470, and the identity associated with the client module 450. At step 424, the authentication token module 460 provides the creation key to the client module 450. At step 426, the client module 450 generates an authentication token based on the creation key. At step 428, the client module 450 sends the authentication token 428 to the server module 470. In this step, the authentication token can be sent through a number of intermediates, such as proxies or frontend services. At step 430, the server module 470 generates a derived creation key. In this step, the derived creation key can be based on the verification key and the identity associated with the client module 450. At step 432, the server module 470 verifies the authentication token based on the derived creation key. In this step, by verifying the authentication token, the server module 470 can verify that the authentication token was sent by the client module 450. At step 434, the server module 470 sends a response to the client module 450. All examples herein are provided for illustrative purposes, and there can be many variations and other possibilities.

Figure 5:
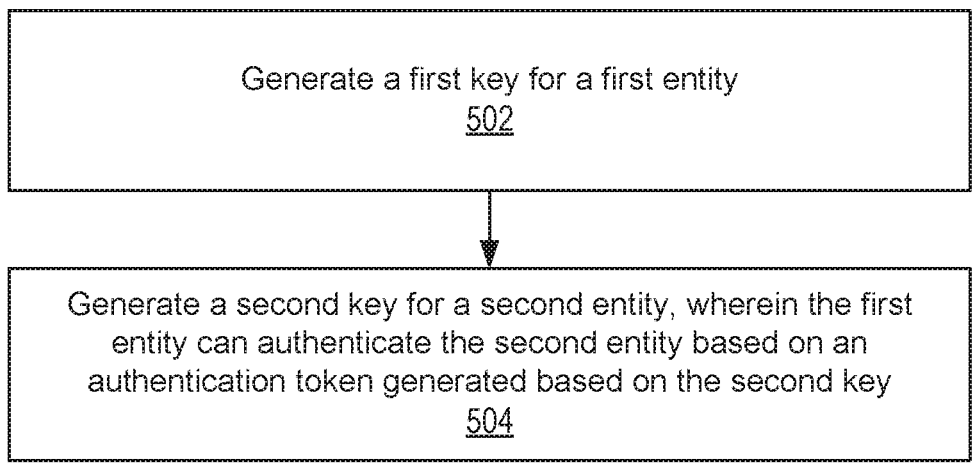
FIG. 5 illustrates an example process for generating a first key and generating a second key, according to an embodiment of the present technology.

FIG. 5 illustrates an example method 500 for generating a first key for a first entity and generating a second key for a second entity, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 can generate a first key for a first entity. The first key can be, for example, a validation key, as described herein, and the first entity can be, for example, a server entity, as described herein. At block 504, the example method 500 can generate a second key for a second entity, wherein the first entity can authenticate the second entity based on an authentication token generated based on the second key. The second key can be, for example, a creation key, as described herein, and the second entity can be, for example, a client entity, as described herein. All examples herein are provided for illustrative purposes, and there can be many variations and other possibilities.

It is contemplated that there can be many other uses, applications, and/or variations associated with the various embodiments of the present technology. For example, in some cases, user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
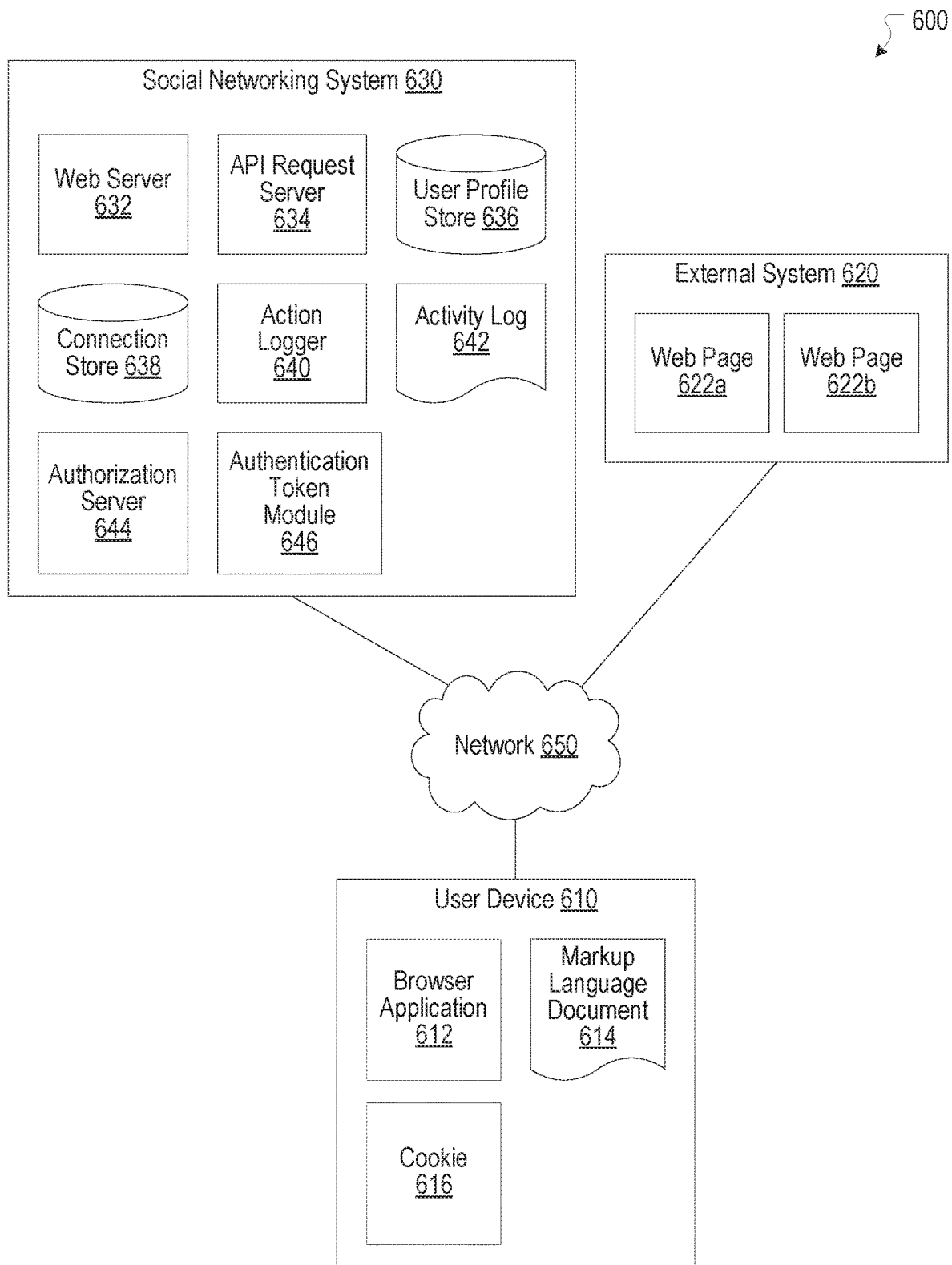
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, Code Division Multiple Access (CDMA), Global System for Mobile Communications (GSM), Long Term Evolution (LTE), digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects another user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and Short Message Service (SMS) messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an authentication token module 646. The authentication token module 646, for example, can be implemented as some or all of the functionality of the authentication token module 102 of FIG. 1. As discussed previously, it should be appreciated that there can be many variations or other possibilities.

Hardware Implementation

Figure 7:
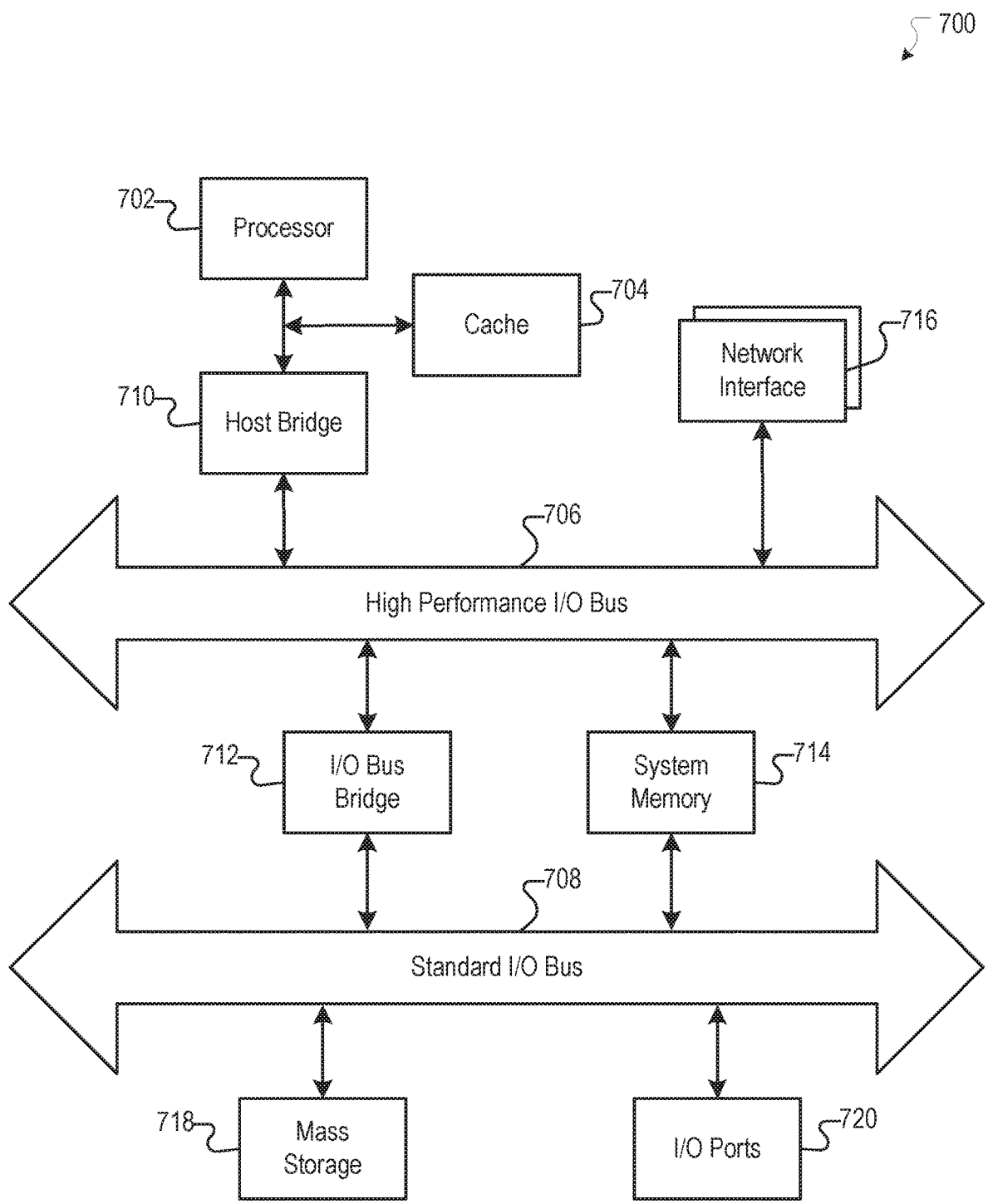
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., Dynamic Random Access Memory (DRAM)) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
generating, by a computing system, a first key for a first server entity associated with a first backend service of a social networking system; and
generating, by the computing system, a second key for a second entity, wherein the second entity is a client and the first backend service can authenticate the second entity and a request by the second entity based on an authentication token generated based on the second key, wherein the request by the second entity is provided to the backend service through an intermediary, and wherein the intermediary and the first backend service are controlled by a common entity.

2. The computer-implemented method of claim 1, wherein the first key is generated based in part on an identity associated with the first server entity.

3. The computer-implemented method of claim 2, wherein the second key is generated based in part on an identity associated with the second entity and the identity associated with the first server entity.

4. The computer-implemented method of claim 1, wherein a derived second key, symmetric to the second key, can be generated based on the first key and an identity associated with the second entity.

5. The computer-implemented method of claim 1, wherein the first key is generated based on applying a pseudorandom function to a root key and an identity associated with the first server entity.

6. The computer-implemented method of claim 1, wherein the second key is generated based on applying a pseudorandom function to the first key and an identity associated with the second entity.

7. The computer-implemented method of claim 1, wherein the authentication token comprises a message associated with the request and a message authentication code.

8. The computer-implemented method of claim 7, wherein the message authentication code is generated based on the second key and the message.

9. The computer-implemented method of claim 7, wherein the message authentication code is authenticated.

10. The computer-implemented method of claim 9, wherein the message authentication code is authenticated based on a derived second key symmetric to the second key.

11. The computer-implemented method of claim 1, wherein the intermediary includes a proxy or a frontend service associated with a social networking system.

12. A system comprising:
at least one processor; and
a memory storing instructions that, when executed by the at least one processor, cause the system to perform:
generating a first key for a first server entity associated with a first backend service of a social networking system; and
generating a second key for a second entity, wherein the second entity is a client and the first backend service can authenticate the second entity and a request by the second entity based on an authentication token generated based on the second key, wherein the request by the second entity is provided to the backend service through an intermediary, and wherein the intermediary and the first backend service are controlled by a common entity.

13. The system of claim 12, wherein the first key is generated based in part on an identity associated with the first server entity.

14. The system of claim 13, wherein the second key is generated based in part on an identity associated with the second entity and the identity associated with the first server entity.

15. The system of claim 12, wherein a derived second key, symmetric to the second key, can be generated based on the first key and an identity associated with the second entity.

16. A non-transitory computer-readable storage medium including instructions that, when executed by at least one processor of a computing system, cause the computing system to perform a method comprising:
  generating a first key for a first server entity associated with a first backend service of a social networking system; and
  generating a second key for a second entity, wherein the second entity is a client and the first backend service can authenticate the second entity and a request by the second entity based on an authentication token generated based on the second key, wherein the request by the second entity is provided to the backend service through an intermediary, and wherein the intermediary and the first backend service are controlled by a common entity.

17. The non-transitory computer-readable storage medium of claim 16, wherein the first key is generated based in part on an identity associated with the first server entity.

18. The non-transitory computer-readable storage medium of claim 17, wherein the second key is generated based in part on an identity associated with the second entity and the identity associated with the first server entity.

* * * * *